(12) United States Patent
Huang

(10) Patent No.: US 8,752,981 B2
(45) Date of Patent: Jun. 17, 2014

(54) LIGHT SOURCE APPARATUS

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 32 days.

(21) Appl. No.: 13/361,096

(22) Filed: Jan. 30, 2012

(65) Prior Publication Data

US 2012/0275149 A1    Nov. 1, 2012

(30) Foreign Application Priority Data

Apr. 29, 2011    (TW) .............................. 100114999 A

(51) Int. Cl.
*F21V 1/00*    (2006.01)
*G02B 27/20*    (2006.01)
*H01S 3/00*    (2006.01)

(52) U.S. Cl.
USPC ............ 362/235; 362/259; 372/107; 372/108

(58) Field of Classification Search
USPC .................. 362/235, 259; 372/50.12, 50.121, 372/50.23, 107, 108
See application file for complete search history.

(56) References Cited

U.S. PATENT DOCUMENTS

| | | | |
|---|---|---|---|
| 5,048,911 A | 9/1991 | Sang et al. | |
| 6,229,831 B1 | 5/2001 | Nightingale et al. | |
| 6,240,116 B1 | 5/2001 | Lang et al. | |
| 6,779,892 B2 * | 8/2004 | Agostinelli et al. | 353/7 |
| 6,882,379 B1 * | 4/2005 | Yokoyama et al. | 349/61 |
| 6,918,682 B2 * | 7/2005 | Kim et al. | 362/231 |
| 7,006,549 B2 * | 2/2006 | Anikitchev et al. | 372/97 |
| 7,070,281 B2 * | 7/2006 | Kato | 353/20 |
| 7,270,425 B2 * | 9/2007 | Arai et al. | 353/87 |
| 7,270,427 B2 * | 9/2007 | Sakata | 353/94 |
| 7,434,945 B2 * | 10/2008 | Maeda et al. | 353/99 |
| 7,515,346 B2 | 4/2009 | Govorkov et al. | |
| 7,542,208 B2 | 6/2009 | Gao | |

(Continued)

FOREIGN PATENT DOCUMENTS

| | | |
|---|---|---|
| CN | 1504792 A | 6/2004 |
| CN | 101185208 A | 5/2008 |

(Continued)

OTHER PUBLICATIONS

First Office Action for Chinese Application No. 201110118392.8; Date of Mailing: Jun. 27, 2013; with English Translation.

(Continued)

*Primary Examiner* — Hargobind S Sawhney
*Assistant Examiner* — Alexander Garlen
(74) *Attorney, Agent, or Firm* — Cantor Colburn LLP

(57) ABSTRACT

A light source apparatus comprising an optical module is disclosed. The optical module has a first optical plate and a second optical plate. The first optical plate comprises a first transparent portion and a first reflective portion. The second optical plate comprises a second transparent portion and a second reflective portion. The light source apparatus comprises a first laser array, a second laser array and a third laser array for projecting a first light, a second light and a third light towards the optical module along a first incident direction, a second incident direction and a third incident direction, respectively. The first light passes through the first and second transparent portions to travel along the emergent direction. The second light reflected by the first reflective portion travels along the emergent direction. The third light reflected by the second reflective portion travels along the emergent direction.

17 Claims, 7 Drawing Sheets

(56) References Cited

U.S. PATENT DOCUMENTS

| | | | |
|---|---|---|---|
| 7,764,432 B2 | 7/2010 | Miyajima | |
| 2002/0154404 A1* | 10/2002 | Sedlmayr | 359/487 |
| 2004/0067016 A1 | 4/2004 | Anikitchev et al. | |
| 2005/0179884 A1 | 8/2005 | Gui et al. | |
| 2005/0219468 A1* | 10/2005 | Yoshii et al. | 353/31 |

FOREIGN PATENT DOCUMENTS

| | | |
|---|---|---|
| CN | 100460927 C | 2/2009 |
| CN | 101470337 A | 7/2009 |
| CN | 201464788 U | 5/2010 |
| CN | 201780448 U | 3/2011 |
| JP | 3734010 B2 | 1/2006 |
| TW | 200508781 | 3/2005 |
| WO | 2009122987 A1 | 10/2009 |

OTHER PUBLICATIONS

Second Office Action for Chinese Patent Application No. 201110118392.8, dated Feb. 17, 2014. English Abstract attached.

* cited by examiner

LIGHT SOURCE APPARATUS

This application claims priority to Taiwan Patent Application No. 100114999 filed on Apr. 29, 2011, the disclosure of which is incorporated herein by reference in its entirety.

CROSS-REFERENCES TO RELATED APPLICATIONS

Not applicable.

BACKGROUND OF THE INVENTION

1. Field of the Invention

The present invention provides a light source apparatus, and more particularly, to a light source apparatus that is capable of effectively concentrating lights emitted by laser arrays.

2. Descriptions of the Related Art

Over recent years, light source modules that are formed of semiconductor laser arrays have been applied to many more projection display apparatuses. Compared to the conventional light sources (e.g., halogen lamps or high-pressure mercury lamps) of projection display apparatuses, semiconductor lasers can present a picture with a wider color gamut because the laser light generated by the semiconductor lasers has a very narrow band width. Therefore, a light source apparatus that is formed of a laser array light source module can provide better color presentation for the projection display apparatus.

However, in conventional laser array light source modules, a plurality of laser arrays are usually disposed on the side of a conventional optical module consisting of an optical lens assembly (i.e., including prisms or mirrors) or a more complex optical assembly. Each of the laser arrays emits a laser light beam into the conventional optical module respectively, and the laser light beams emitted by the laser arrays are then refracted and reflected towards the same direction to form a projection locus. It is worth noting that the conventional laser array light source module has disadvantages such as a complicated structure (e.g., the length of the integration rod is increased to cause an increased volume of the whole projection display apparatus) and a large footprint; furthermore, because of the restriction of the arrangement of the optical module thereof, the conventional laser array light source module lacks flexibility in the adjustment of color combinations.

Accordingly, to overcome the disadvantages of conventional laser array light source modules such as a complicated structure, poor projection spot and poor flexibility in the adjustment of color combinations, it is important to provide a compact light source module that forms a better projection spot than the conventional optical module and also meets the demands for rapid customization.

SUMMARY OF THE INVENTION

An objective of the present invention is to provide a light source apparatus capable of effectively concentrating lights emitted by laser arrays. The light source apparatus is simple in structure, easy to manufacture, assemble and adjust, and has a small footprint; moreover, it can form a projection spot with better brightness and can improve the flexibility in the adjustment of color combinations.

To achieve the aforesaid objective, the present invention discloses a light source apparatus, which comprises an optical module, a first laser array, a second laser array and a third laser array. The optical module comprises a first optical plate and a second optical plate. The first optical plate comprises a first transparent portion and a first reflective portion. The second optical plate comprises a second transparent portion and a second reflective portion, and intersects with the first optical plate. The first laser array emits the first light towards the optical module along the first incident direction; the first light is directed to travel along an emergent direction after passing through the first transparent portion and the second transparent portion. The second laser array emits a second light towards the optical module along the second incident direction; the second light is directed to travel along the emergent direction after being reflected by the first reflective portion. The third laser array emits a third light towards the optical module along the third incident direction; the third light is directed to travel along the emergent direction after being reflected by the second reflective portion.

The optical module may further comprise a third optical plate disposed adjacent to the first optical plate and the second optical plate on the side of the emergent direction. The third optical plate comprises a third transparent portion and a third reflective portion.

The light source apparatus may further comprise a fourth laser array emitting a fourth light towards the third optical plate along the fourth incident direction; the fourth light is directed to travel along the emergent direction after being reflected by the third reflective portion.

With the aforesaid arrangement, the light source apparatus of the present invention can effectively concentrate lights emitted by the laser arrays. The light source apparatus of the present invention comprises an optical module of a novel structure. A second laser array, third laser array and fourth laser array are provided therein in a two-dimensional distribution to emit respective light beams for filling gaps between light beams emitted by the first laser array. Apart from being easy to manufacture and assemble, the light source apparatus of the present invention can integrate laser light beams from three or four areas into a single plane of a small area successfully to impart better brightness to an image projected by the light source apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, a light source apparatus of the present invention will be explained with reference to embodiments thereof. It shall be appreciated that these embodiments are not intended to limit the present invention to any specific environment, applications or particular implementations described in these embodiments. Therefore, the description of these embodiments is only for the purpose of illustration rather than to limit the present invention. Furthermore, the attached drawings may be drawn in a slightly simplified or exaggerated way for ease of understanding; the numbers, shapes and dimensional scales of elements depicted may not be exactly the same as those in practical implementations and are not intended to limit the present invention, which shall be stated beforehand hereby.

Figure 1:
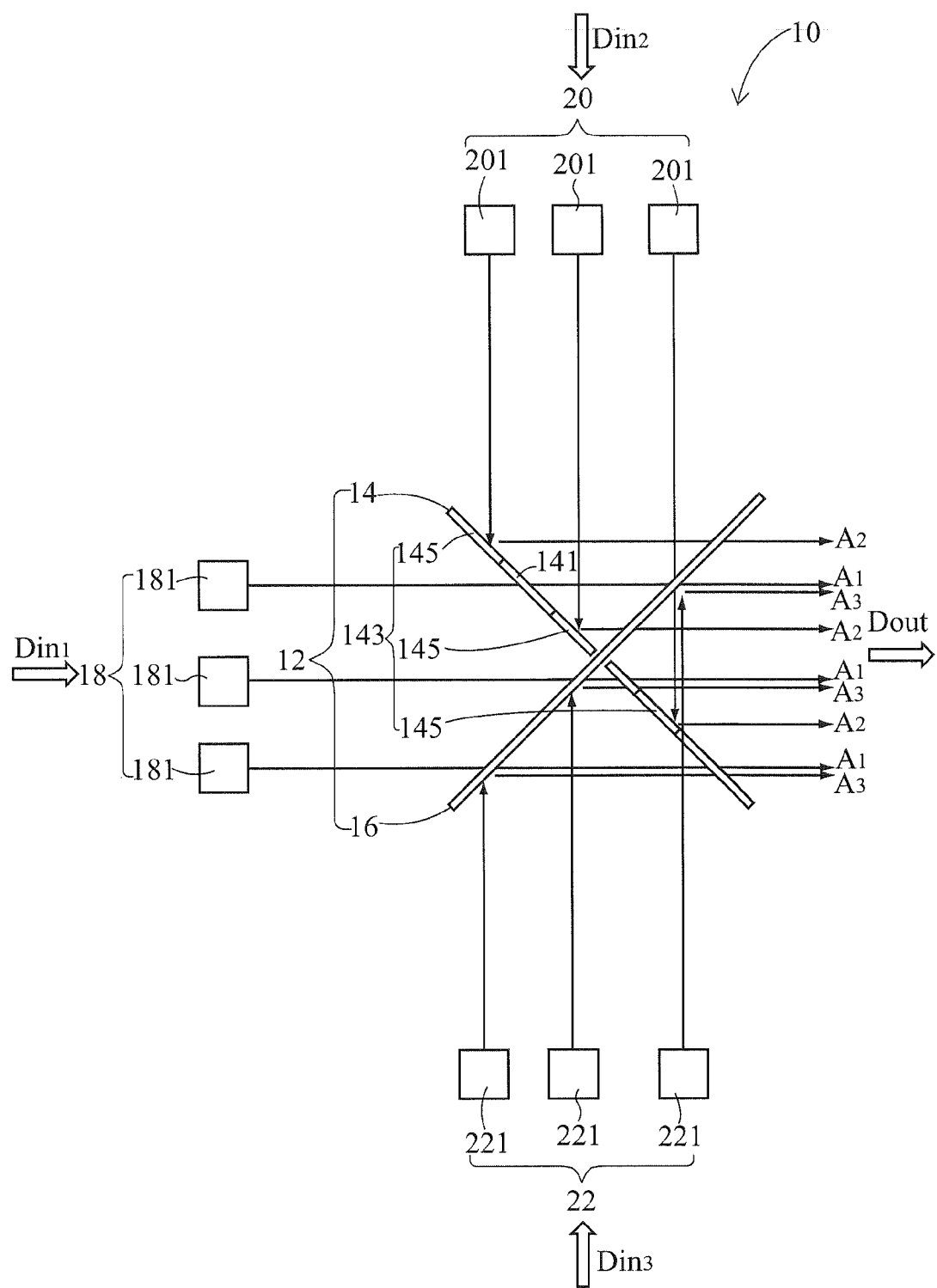
FIG. 1 is a schematic functional block diagram of a light source apparatus according to the first embodiment of the present invention.
Figure 2:
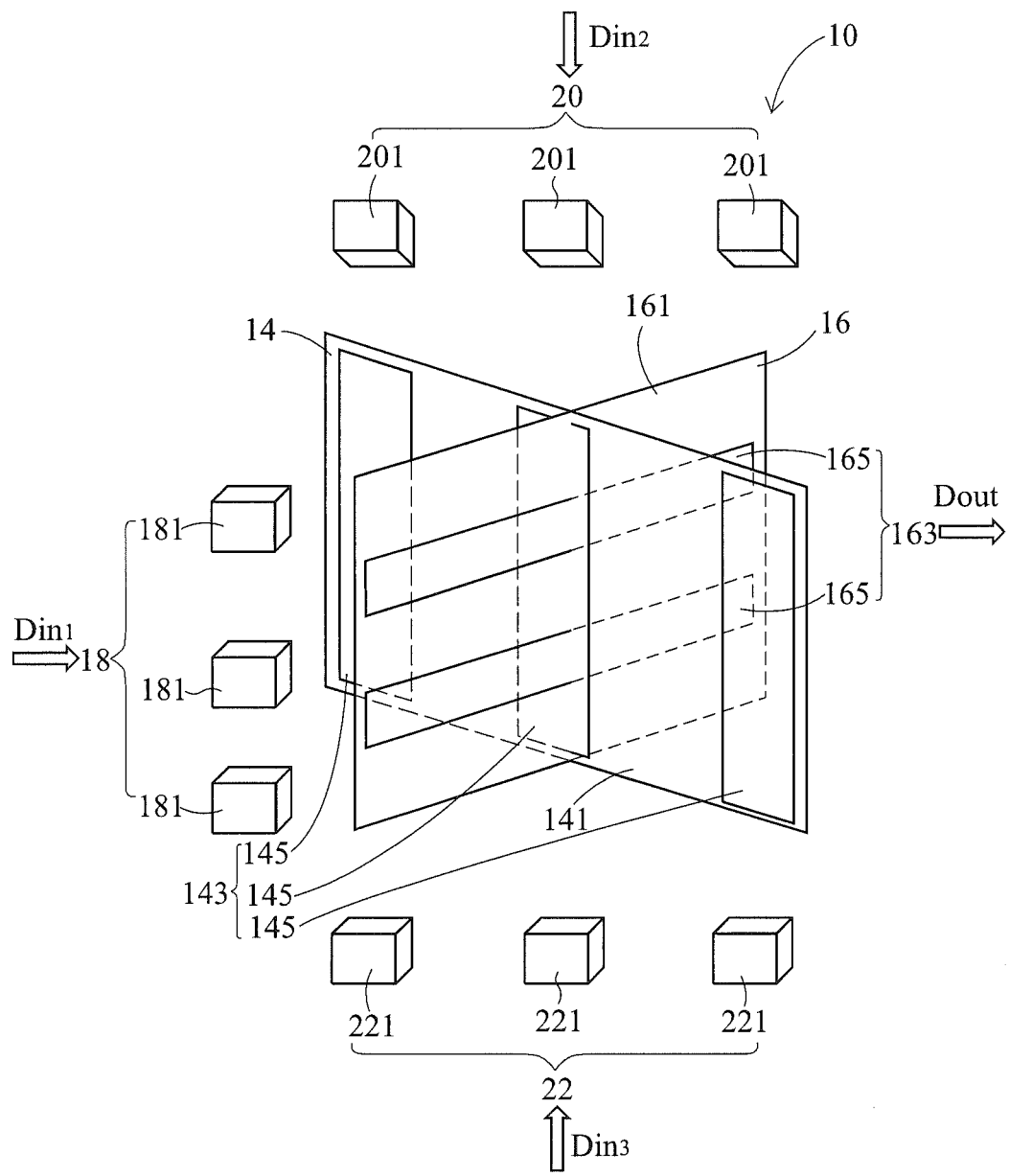
FIG. 2 is a perspective view of the light source apparatus according to the first embodiment of the present invention.

FIG. 1 is a schematic functional block diagram of a light source apparatus 10 according to the first embodiment of the present invention, while FIG. 2 is a perspective view of the light source apparatus 10 according to the first embodiment of the present invention. The light source apparatus 10 comprises an optical module 12 and a plurality of laser arrays.

The optical module 12 comprises a first optical plate 14 and a second optical plate 16. In this embodiment, the first optical plate 14 comprises a first transparent portion 141 and a first reflective portion 143. The first reflective portion 143 may consist of a plurality of first reflective units 145. The first reflective units 145 are attached to the surface of the first transparent portion 141 so that transparent and reflective areas interlaced with each other are formed on the first optical plate 14. The second optical plate 16 comprises a second transparent portion 161 and a second reflective portion 163. The second reflective portion 163 may consist of a plurality of second reflective units 165. The second reflective units 165 are attached to the surface of the second transparent portion 161 so that the transparent and reflective areas interlaced with each other are formed on the second optical plate 16. It shall be noted that as shown in FIG. 1, the second optical plate 16 may intersect with the first optical plate 14; e.g., the two optical plates intersect with each other at an angle of 90 degrees.

In detail, the laser arrays of the light source apparatus 10 may include a first laser array 18, a second laser array 20 and a third laser array 22. The first laser array 18, the second laser array 20 and the third laser array 22 of the present invention may each substantially comprise a plurality of columns of laser units; and for convenience of the description, only one column of laser units is depicted in FIGS. 1 and 2 as a representative, although the present invention is not limited thereto. In this embodiment, the first laser array 18 emits the first light towards the optical module 12 along the first incident direction Din1. The first light travels along the emergent direction Dout after passing through the first transparent portion 141 and the second transparent portion 161. The second laser array 20 emits the second light towards the optical module 12 along the second incident direction Din2. The second light travels along the emergent direction Dout after being reflected by the first reflective portion 143. The third laser array 22 emits the third light towards the optical module 12 along the third incident direction Din3. The third light travels along the emergent direction Dout after being reflected by the second reflective portion 163. It is worth noting that as shown in FIG. 1, the first incident direction Din1, second incident direction Din2, third incident direction Din3 and emergent direction Dout forms an angle of 45 degrees each with the first optical plate 14 and the second optical plate 16 so that the first light, the second light and the third light can travel with a same direction after passing through the optical module 12.

Each of the laser arrays of the present invention consists of a plurality of corresponding laser units. For example, the first laser array 18 may comprise a plurality of first laser unit rows, each of which consists of a plurality of first laser units 181; the second laser array 20 may comprise a plurality of second laser unit rows, each of which consists of a plurality of second laser units 201; and the third laser array 22 may comprise a plurality of third laser unit rows, each of which consists of a plurality of third laser units 221. Each of the first laser units 181, second laser units 201 and third laser units 221 are adapted to emit a first light beam A1, a second light beam A2 and a third light beam A3 respectively. The first light beams A1 form the first light, the second light beams A2 form the second light, and the third light beams A3 form the third light.

Figure 3:
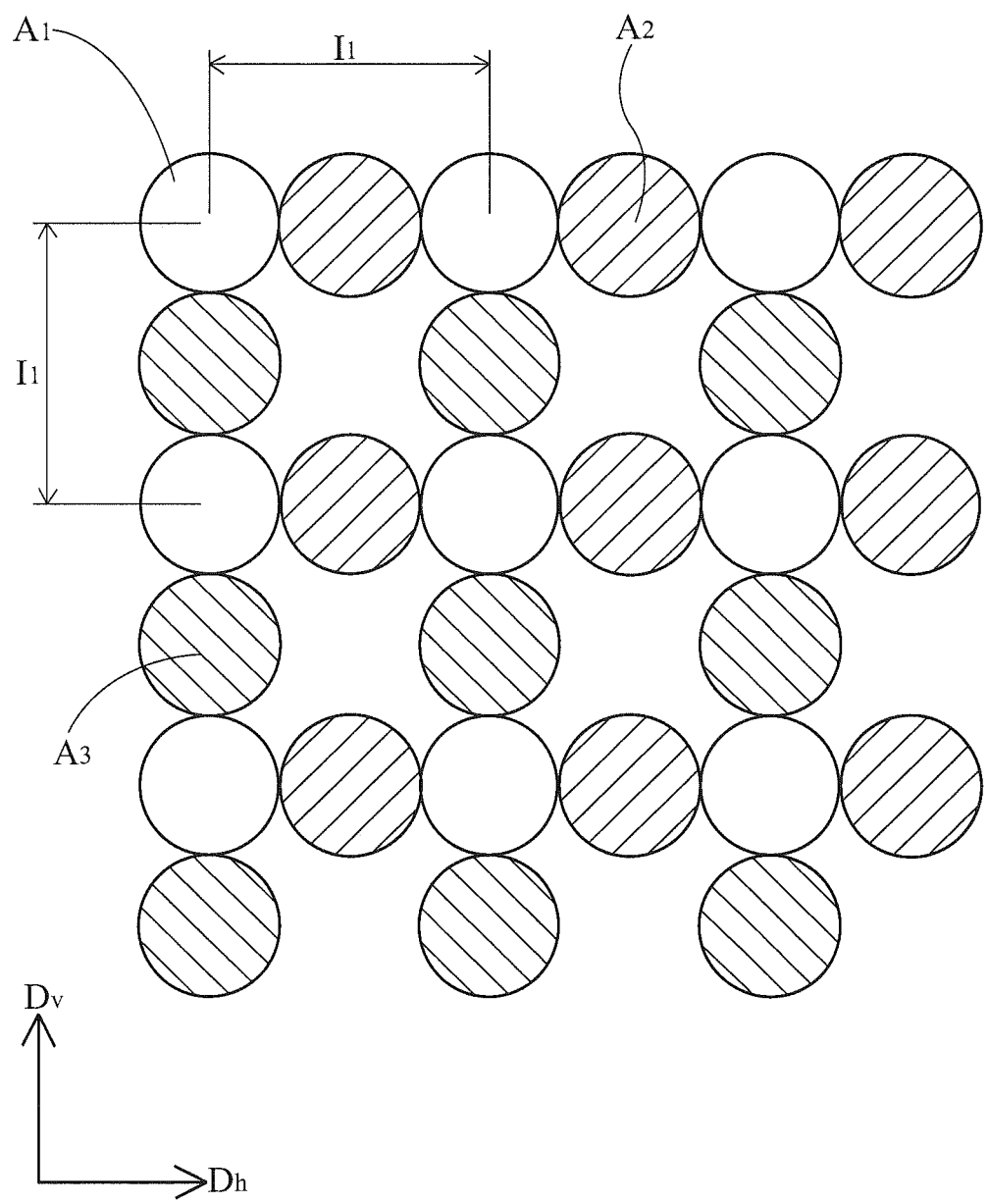
FIG. 3 is a projection spot diagram of laser units of the light source apparatus according to the first embodiment of the present invention.

To understand the structural arrangement of the light source apparatus 10 more clearly, please refer to FIG. 3. FIG. 3 is a projection spot diagram of the laser units of the light source apparatus 10 according to the first embodiment of the present invention. As shown in FIGS. 1 to 3, every two adjacent first laser unit rows and every two adjacent second laser unit rows are both spaced at a predetermined interval I1 from each other, and some of the first laser units 181 and some of the second laser units 201 are disposed on an identical horizontal reference plane; therefore, the projection positions of the first light beams A1 and the second light beams A2 on the first optical plate 14 alternate with and are spaced at an equal interval from each other in a horizontal direction (Dh) (i.e., in the form of a transverse distribution), and the first reflective units 145 are longitudinally distributed corresponding to the second light beams A2 along a longitudinal direction (Dv). On the other hand, some of the first laser units 181 and some of the third laser units 221 are disposed along the vertical direction, so the projection positions of the first light beams A1 and the third light beams A3 on the second optical plate 16 alternate with and are spaced at an equal interval from each other in the longitudinal direction (i.e., in the form of a longitudinal distribution). The second reflective units 165 are transversely distributed corresponding to the third light beams A3. Therefore, the second light beams A2 and the third light beams A3 emitted by the second laser array 20 and the third laser array 22 respectively can be used to fill gaps between the first light beams A1 emitted by the first laser array 18, which helps to increase the brightness of an image projected by the light source apparatus 10.

Figure 4:
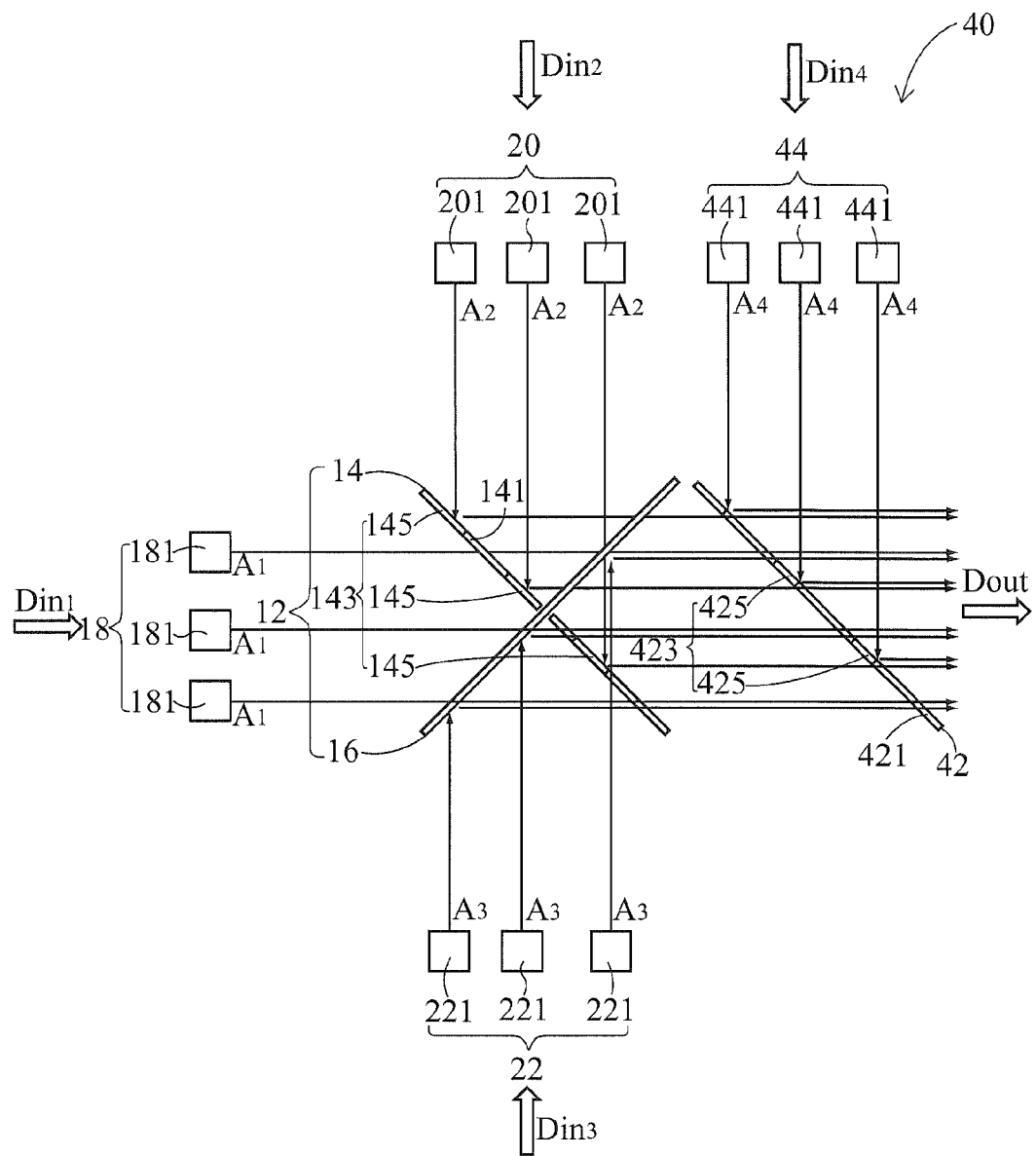
FIG. 4 is a schematic functional block diagram of a light source apparatus according to the second embodiment of the present invention.
Figure 5:
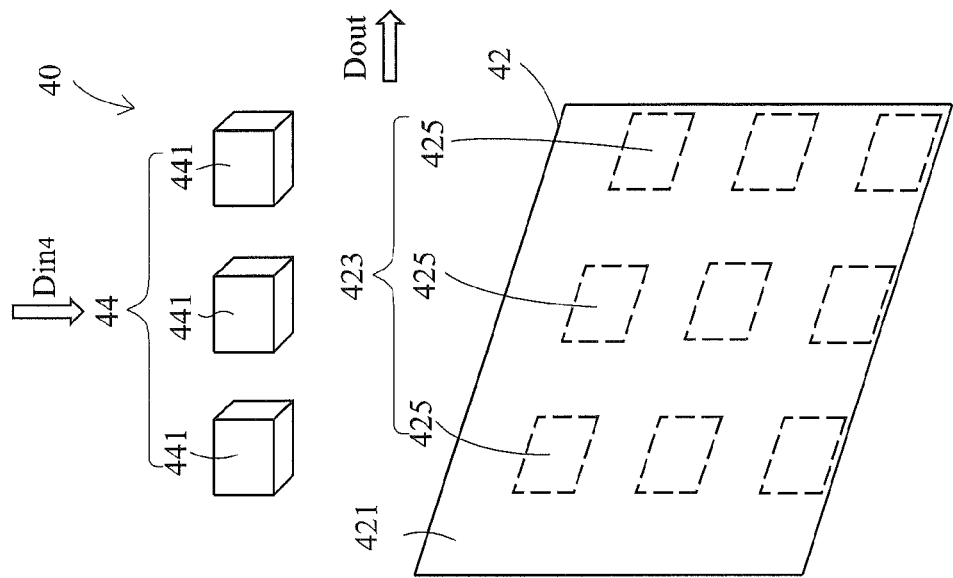
FIG. 5 is a perspective view of the light source apparatus according to the second embodiment of the present invention.
Figure 5:
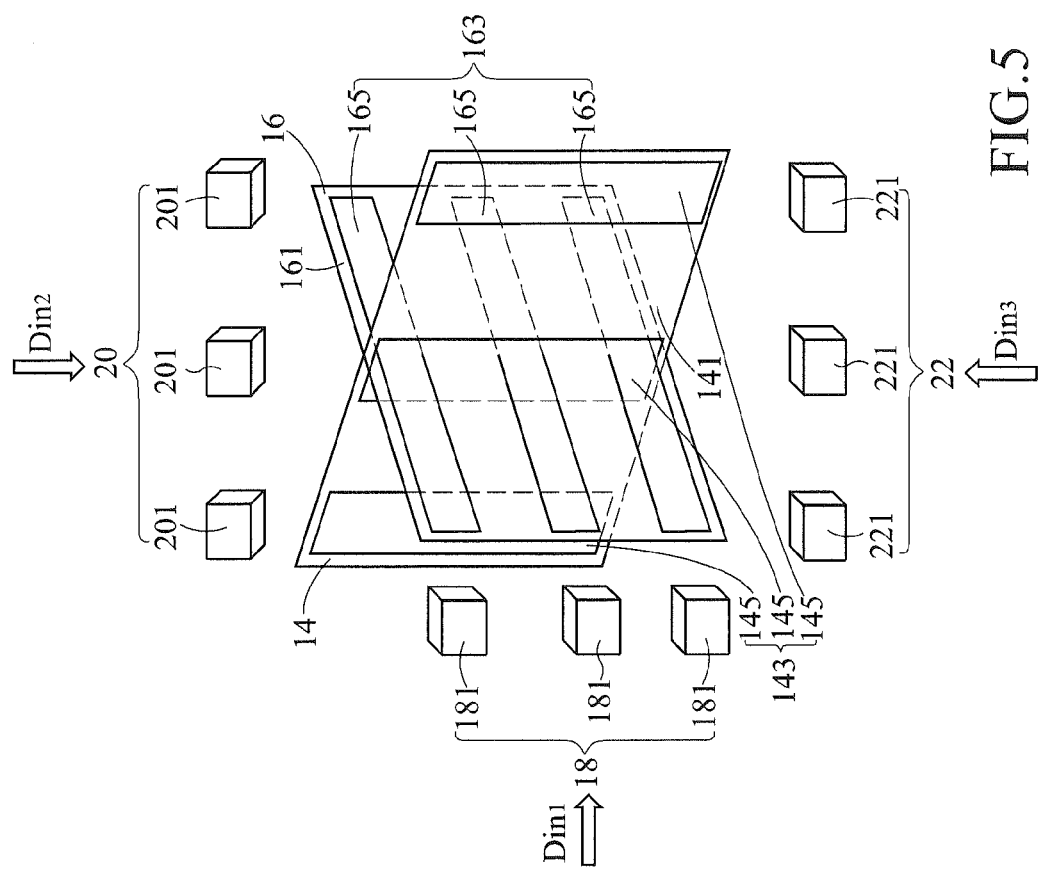
Figure 6:
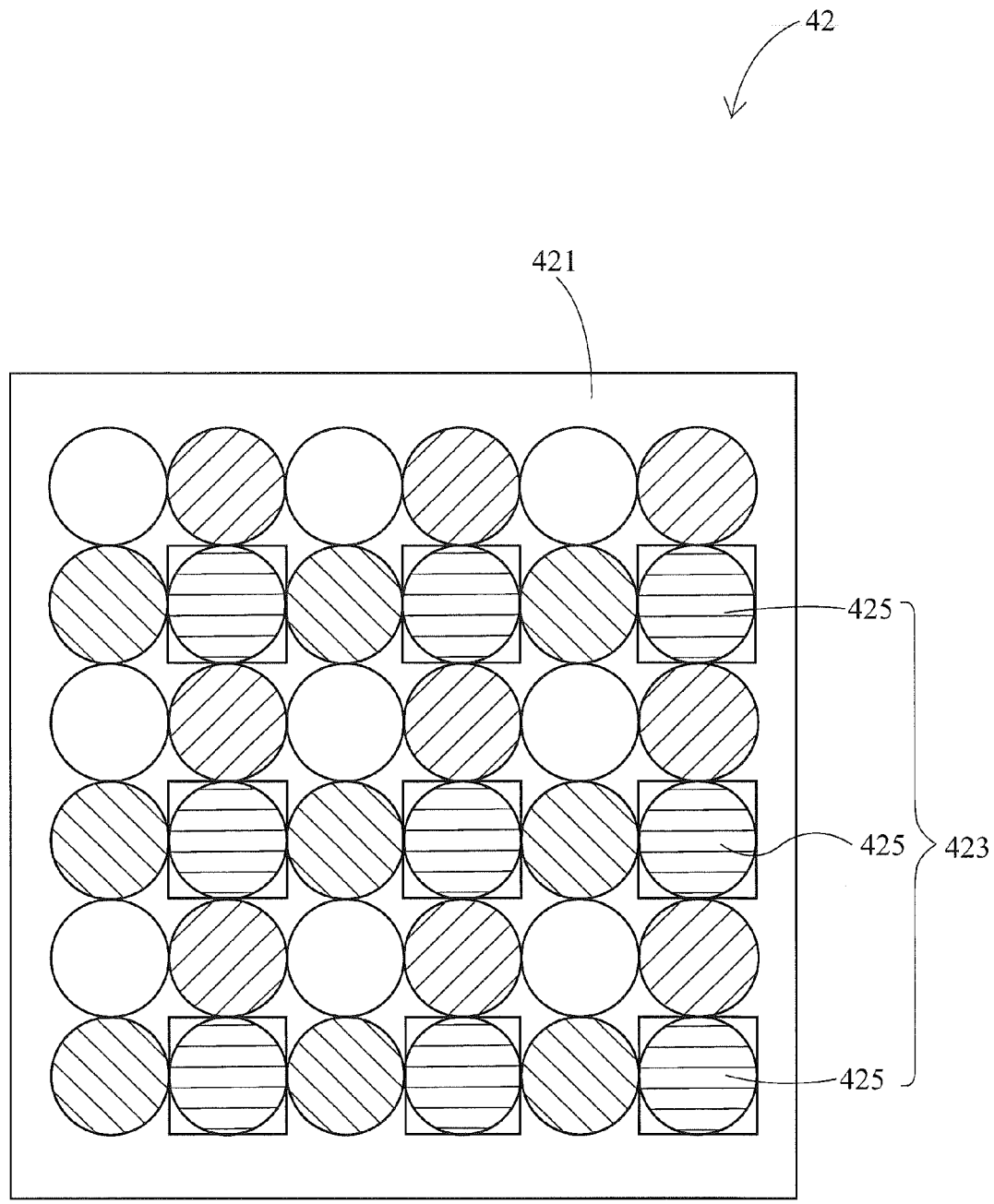
FIG. 6 is a front view illustrating the projection spot of laser units and a part of the third optical plate according to the second embodiment of the present invention.

Next, FIG. 4 is a schematic functional block diagram of a light source apparatus 40 according to the second embodiment of the present invention, FIG. 5 is a perspective view of the light source apparatus 40 according to the second embodiment of the present invention, and FIG. 6 is a front view illustrating the projection spot of laser units and a part of the third optical plate according to the second embodiment of the present invention. In the second embodiment, the light source apparatus 40 comprises the first optical plate 14, the second optical plate 16, the first laser array 18, the second laser array 20 and the third laser array 22; configurations and functions of which are identical to those described in the first embodiment and thus will not be further described herein. In this embodiment, the light source apparatus 40 further comprises a third optical plate 42 disposed on the side of the first optical plate 14 and the second optical plate 16 adjacent to the emergent direction Dout.

The third optical plate 42 comprises a third transparent portion 421 and a third reflective portion 423. The third reflective portion 423 may consist of a plurality of rectangular third reflective units 425 that are attached to the surface of the third transparent portion 421 in the form of a matrix so that the transparent and reflective areas interlaced with each other are formed on the third optical plate 42. Therefore, the first light, second light and third light passing through the first optical plate 14 and the second optical plate 16 will further pass through the third transparent portion 421 of the third optical plate 42.

The light source apparatus 40 according to the second embodiment of the present invention further comprises a fourth laser array 44. The fourth laser array 44 may substantially comprise a plurality of fourth laser unit rows, each of which consists of a plurality of fourth laser units 441; and for the convenience of the description, only one column of laser unit rows is depicted in FIGS. 4 and 5 as a representative, although the present invention is not limited thereto. The fourth laser array 44 emits a fourth light towards the third optical plate 42 along the fourth incident direction Din4, and the fourth incident direction Din4 forms an angle of 45 degrees with the third optical plate 42 so that the fourth light travels along the emergent direction Dout after being reflected by the third reflective portion 423.

As shown in FIGS. 5 and 6, FIG. 6 illustrates a projection spot obtained through the combination with the projection spot depicted in FIG. 3. The fourth laser units 441 comprised in the fourth laser array 44 can emit a fourth light beam A4 to the corresponding third reflective units 425 respectively to form the fourth light. Thus, the distributions of the light beams emitted by the first laser units 181, second laser units 201, third laser units 221 and fourth laser units 241 on the third optical plate 42 have been clearly depicted in FIG. 6. Additionally, the light beams having the same reference numerals as those in FIG. 3 will not be further described herein.

Figure 7:
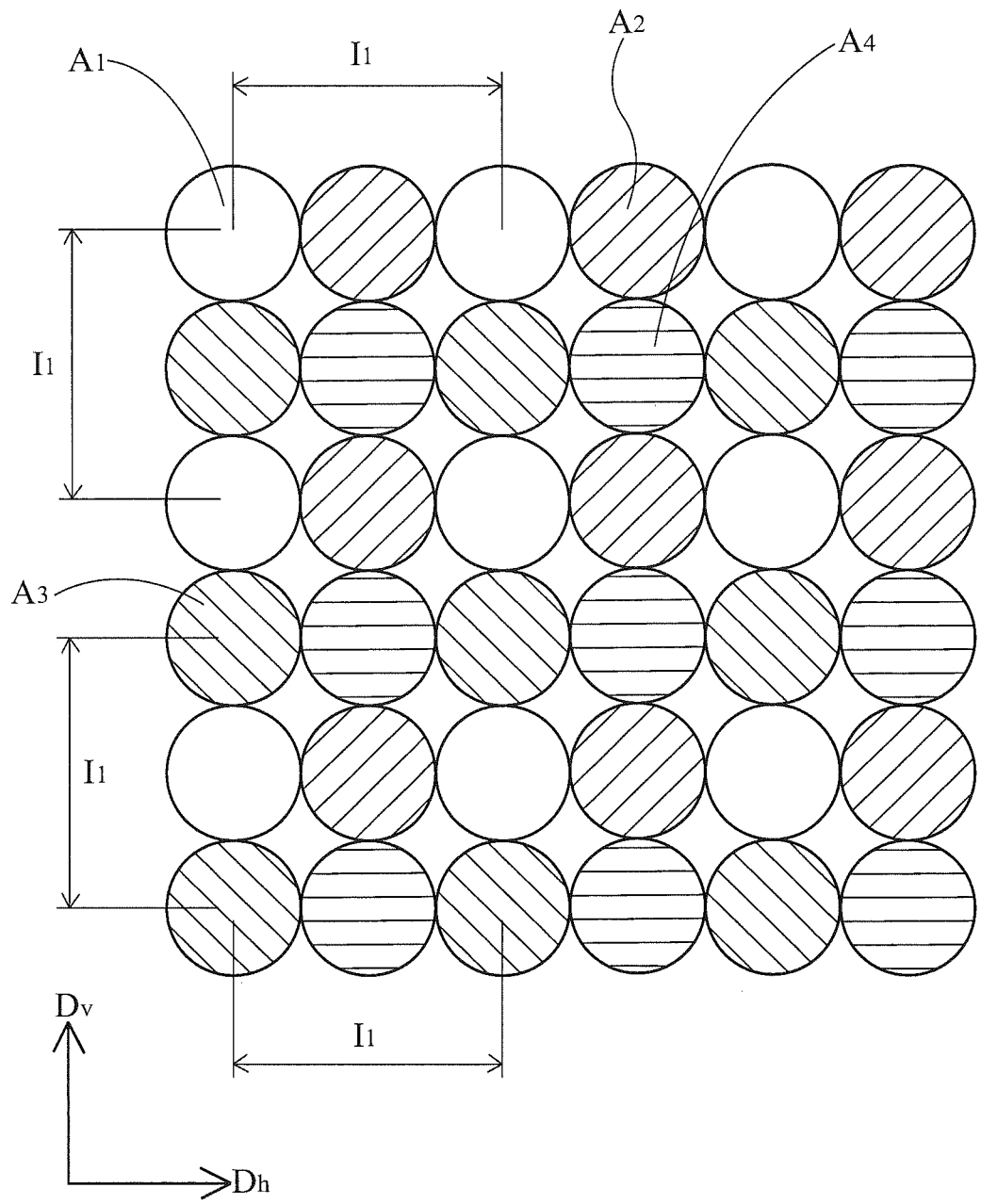
FIG. 7 is a projection spot diagram of the laser units of the light source apparatus according to the second embodiment of the present invention.

FIG. 7 illustrates a projection spot diagram of the laser units of the light source apparatus 40 according to the second embodiment of the present invention. As shown in FIGS. 4 to 7, the projection positions of the fourth light beams A4 and the second light beams A2 on the third optical plate 42 alternate with each other in a vertical direction (i.e., in the form of a longitudinal distribution), while the projection positions of the fourth light beams A4 and the third light beams A3 on the third optical plate 42 alternate with each other in a horizontal direction (i.e., in the form of a transverse distribution). That is, the fourth laser units 441 and the second laser units 201 are disposed along a vertical direction, while the fourth laser units 441 and the third laser units 221 are disposed on an identical horizontal plane. Therefore, the fourth light beams A4 emitted by the fourth laser array 44 can be used to fill spaces between adjacent second light beams A2 and third light beams A3 in the projection spot shown in FIG. 3, which helps to further increase the brightness of the image projected by the light source apparatus 40.

As compared to the prior art, the light source apparatus of the first embodiment has at least two optical plates, each attached with a strip-like reflective portion and intersecting with each other so that three laser unit arrays in a two-dimensional distribution can emit lights from three directions in an optical module consisting of the at least two optical plates with a novel structure; and according to the longitudinally and transversely interlaced arrangements of the laser units of the three laser unit arrays as well as the structural relationships between the transparent portion and reflective portion orthogonally arranged on the two optical plates. A projection spot with better brightness is formed in the emergent direction of the optical module. Furthermore, in the light source apparatus of the second embodiment, three optical plates and four laser unit arrays are arranged so that the additional fourth laser unit array can be used to fill spaces in the projection spot of the first embodiment that would otherwise degrade the brightness. Apart from being easy to manufacture and assemble, the light source apparatus of the present invention can synchronously integrate laser light beams from three or four areas distributed in three directions into the single plane of a small area successfully.

According to the above descriptions, the second laser array, the third laser array and the fourth laser array of the light source apparatus of the present invention are used to fill spaces (e.g., spaces between every two adjacent first laser units in the horizontal direction, spaces between every two adjacent first laser units in the vertical direction, and spaces among four first laser units that are arranged in a crisscross-shaped form) of adjacent first light beams emitted by first laser units of the first laser array respectively. Therefore, the light source apparatus of the present invention can effectively process and concentrate laser light beams from three or four directions simultaneously to enhance the flexibility in color variations; and the novel structure of the present invention can be combined and adjusted depending on the user's needs to achieve the desired optical effect, thereby effectively solving the problem with the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A light source apparatus, comprising:
an optical module including:
a first optical plate comprising a first transparent portion and a first reflective portion; and
a second optical plate intersecting with the first optical plate, the second optical plate comprising a second transparent portion and a second reflective portion;
a first laser array comprising a plurality of first laser units, each of the first laser units emitting a first light beam, the first light beams form a first light being emitted towards the optical module along a first incident direction, the first light being directed to travel along an emergent direction after passing through the first transparent portion and the second transparent portion;
a second laser array comprising a plurality of second laser units, each of the second laser units emitting a second light beam, the second light beams form a second light being emitted towards the optical module along a second incident direction, the second light being directed to travel along the emergent direction after being reflected by the first reflective portion; and
a third laser array comprising a plurality of third laser units, each of the third laser units emitting a third light beam, the third light beams form a third light being emitted towards the optical module along a third incident direc- tion, the third light being directed to travel along the emergent direction after being reflected by the second reflective portion;

wherein the first light beams and the second light beams are projected onto the first optical plate, the first and second light beams alternate with and are spaced at an equal interval from each other in a horizontal direction, and the first light beams and the third light beams are projected onto the second optical plate, the first and third light beams alternate with and are spaced at an equal interval from each other in a vertical direction.

2. The light source apparatus of claim 1, wherein the first reflective portion comprises a plurality of first reflective units, and the second reflective portion comprises a plurality of second reflective units.

3. The light source apparatus of claim 2, wherein the first reflective units are vertically distributed corresponding to the second light beams.

4. The light source apparatus of claim 3, wherein some of the first laser units and some of the second laser units are disposed on an identical horizontal plane.

5. The light source apparatus of claim 3, wherein the second reflective units are horizontally distributed corresponding to the third light beams.

6. The light source apparatus of claim 5, wherein some of the first laser units and some of the third laser units are disposed along a vertical direction.

7. The light source apparatus of claim 5, wherein the first optical plate forms an angle of 90 degrees with the second optical plate therebetween.

8. The light source apparatus of claim 5, wherein each of the first incident direction, the second incident direction, the third incident direction and the emergent direction forms an angle of 45 degrees with the first optical plate or the second optical plate therebetween.

9. The light source apparatus of claim 5, wherein the first laser array comprises a plurality of first laser unit rows spaced at a predetermined interval, and the second laser array comprises a plurality of second laser unit rows spaced at the predetermined interval.

10. The light source apparatus of claim 5, wherein the optical module further comprises:
a third optical plate disposed on a side of the first optical plate and the second optical plate adjacent to the emergent direction, the third optical plate comprising a third transparent portion and a third reflective portion.

11. The light source apparatus of claim 10, wherein the first light, the second light and the third light pass through the first optical plate and the second optical plate and then the third transparent portion.

12. The light source apparatus of claim 11, further comprising:
a fourth laser array emitting a fourth light towards the third optical plate along a fourth incident direction, the fourth light being directed to travel along the emergent direction after being reflected by the third reflective portion.

13. The light source apparatus of claim 12, wherein the fourth laser array comprises a plurality of fourth laser units, each of which emitting a fourth light beam, and the fourth light beams forming the fourth light.

14. The light source apparatus of claim 13, wherein the third reflective portion comprises a plurality of third reflective units distributed corresponding to the fourth light beams.

15. The light source apparatus of claim 14,
wherein the fourth light beams and the second light beams are projected onto the third optical plate, the fourth and second light beams alternate with and are spaced at an equal interval from each other in a vertical direction, and-the fourth light beams and the third light beams are projected onto the third optical plate, the fourth and third light beams alternate with and are spaced at an equal interval from each other in a horizontal direction.

16. The light source apparatus of claim 15, wherein some of the fourth laser units and some of the second laser units are disposed along a vertical direction, and some of the fourth laser units and some of the third laser units are disposed on an identical horizontal plane.

17. The light source apparatus of claim 12, wherein the fourth incident direction forms an angle of 45 degrees with the third optical plate therebetween.

* * * * *